US012528729B2

(12) United States Patent
Cooper et al.

(10) Patent No.: US 12,528,729 B2
(45) Date of Patent: Jan. 20, 2026

(54) LOW-TEMPERATURE GLASS CONTAINER BLOWING PROCESS

(71) Applicant: Owens-Brockway Glass Container Inc., Perrysburg, OH (US)

(72) Inventors: Scott Cooper, Maumee, OH (US);
Andrew Ciaschi, Candor, NY (US);
Brian Coburn, Toledo, OH (US);
William Pinc, Waterville, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 157 days.

(21) Appl. No.: 18/331,459

(22) Filed: Jun. 8, 2023

(65) Prior Publication Data

US 2024/0409448 A1     Dec. 12, 2024

(51) Int. Cl.
| | | |
|---|---|---|
| *C03B 9/193* | (2006.01) | |
| *C03B 9/38* | (2006.01) | |
| *C03B 19/06* | (2006.01) | |
| *C03C 3/078* | (2006.01) | |

(52) U.S. Cl.
CPC ............ *C03B 9/3841* (2013.01); *C03B 9/193* (2013.01); *C03B 19/063* (2013.01); *C03C 3/078* (2013.01)

(58) Field of Classification Search
CPC .. C03B 9/193; C03B 9/14; C03B 9/03; C03B 9/01; C03B 9/04; C03B 9/00
See application file for complete search history.

(56) References Cited

U.S. PATENT DOCUMENTS

| | | | |
|---|---|---|---|
| 3,850,566 A | 11/1974 | Moore | |
| 3,934,743 A | 1/1976 | McChesney et al. | |
| 3,981,673 A | 9/1976 | Sokolow | |
| 4,147,487 A | 4/1979 | Dickson et al. | |
| 4,298,371 A | 11/1981 | Knoth et al. | |
| 4,305,743 A * | 12/1981 | Hommel | C03B 19/1045 |
| | | | 65/135.2 |
| 4,680,050 A * | 7/1987 | Doud | C03B 9/193 |
| | | | 65/229 |
| 5,407,457 A * | 4/1995 | Barbier | C03B 9/325 |
| | | | 65/300 |

(Continued)

FOREIGN PATENT DOCUMENTS

| | | | | |
|---|---|---|---|---|
| CN | 104386914 A | * | 3/2015 | |
| CN | 110282873 A | * | 9/2019 | ............ C03B 25/00 |
| EP | 3372562 A1 | | 9/2018 | |

OTHER PUBLICATIONS

PCT International Search Report and Written Opinion, Application No. PCT/US2024/028342, dated Aug. 28, 2024.

*Primary Examiner* — Erin Snelting
*Assistant Examiner* — Steven S Lee

(57) ABSTRACT

A method of forming a glass container includes providing a glass parison having a tubular wall that includes an inside surface, which defines an interior parison cavity open at one axial end of the tubular wall, and an outside surface. The tubular wall includes an expandable blow portion that has a forming viscosity between $10^{7.5}$ Pa·s and $10^{5.5}$ Pa·s and is also in an isoviscous state. The glass parison is blow molded into a glass container by introducing a compressed gas into the interior parison cavity to thereby cause the expandable blow portion of the tubular wall to expand outwardly into a portion of a wall that defines the glass container.

20 Claims, 7 Drawing Sheets

(56) References Cited

U.S. PATENT DOCUMENTS

| | | | |
|---|---|---|---|
| 6,497,119 B1 | 12/2002 | Hartel et al. | |
| 7,832,234 B2 | 11/2010 | Hoppe et al. | |
| 10,710,918 B1* | 7/2020 | Cooper | C03B 11/10 |
| 10,745,311 B2 | 8/2020 | Guyot | |
| 2005/0173834 A1* | 8/2005 | Lucek | C03B 9/347 |
| | | | 264/319 |
| 2008/0024066 A1* | 1/2008 | Lefevre | H01K 1/28 |
| | | | 501/53 |
| 2009/0249835 A1* | 10/2009 | Flynn | C03B 9/48 |
| | | | 164/45 |
| 2012/0261850 A1* | 10/2012 | Simon | B29C 49/4823 |
| | | | 264/40.6 |
| 2014/0150498 A1 | 6/2014 | D'ovidio et al. | |
| 2017/0137162 A1* | 5/2017 | Kamiya | C03C 3/097 |
| 2018/0105447 A1* | 4/2018 | Graff | C03B 9/1932 |
| 2018/0105456 A1* | 4/2018 | Wang | C03B 9/44 |
| 2018/0257968 A1* | 9/2018 | Guyot | C03B 9/3841 |

* cited by examiner

LOW-TEMPERATURE GLASS CONTAINER BLOWING PROCESS

The present disclosure is directed to the manufacture of glass containers and, more particularly, to a method of forming a glass container from a parison in which the portion of the parison that is outwardly expanded by blowing has attained an isoviscous state.

BACKGROUND

Glass is a rigid amorphous solid that has numerous applications. Soda-lime-silica glass, for example, is used extensively to manufacture a variety of hollow glass articles including containers such as bottles and jars. Soda-lime-silica glass comprises a disordered and spatially crosslinked ternary oxide network of $Na_2O$—$CaO$—$SiO_2$. The $SiO_2$ component is the largest oxide by weight and constitutes the primary network forming material of soda-lime-glass. The $Na_2O$ component functions as a fluxing agent that reduces the melting, softening, and glass transition temperatures of the glass, as compared to pure silica glass, and the CaO component functions as a stabilizer that improves certain physical and chemical properties of the glass including its hardness and chemical resistance (especially with respect to water). Essentially, the inclusion of $Na_2O$ and CaO in the chemistry of soda-lime-silica glass renders the commercial manufacture of glass containers more practical and less energy intensive while still yielding acceptable glass properties. Soda-lime-silica glass, in general and based on the total weight of the glass, includes 60 wt % to 80 wt % $SiO_2$ (more narrowly 70 wt % to 75 wt % $SiO_2$), 8 wt % to 18 wt % $Na_2O$ (more narrowly 12 wt % to 15 wt % $Na_2O$), and 5 wt % to 15 wt % CaO (more narrowly 9 wt % to 13 wt % CaO).

In addition to $SiO_2$, $Na_2O$, and CaO, soda-lime-silica glass may, if desired, include other oxide and non-oxide materials that function as network formers, network modifiers, colorants, decolorants, redox agents, or other agents that affect the properties the final glass. Some examples of these additional materials include aluminum oxide ($Al_2O_3$), magnesium oxide (MgO), potassium oxide ($K_2O$), carbon, nitrates, fluorines, chlorines, and/or elemental or oxide forms of one or more of iron, arsenic, antimony, selenium, chromium, barium, manganese, cobalt, nickel, sulfur, vanadium, titanium, lead, copper, niobium, molybdenum, lithium, silver, strontium, cadmium, indium, tin, gold, cerium, praseodymium, neodymium, europium, gadolinium, erbium, and uranium. Aluminum oxide is one of the more commonly included materials—typically present in an amount up to 3 wt % based on the total weight of the glass—because of its ability to improve the chemical durability of the glass and to reduce the likelihood of devitrification. Regardless of what other oxide and/or non-oxide materials are present in the soda-lime-glass besides $SiO_2$, $Na_2O$, and CaO, the sum total of those additional materials is preferably 10 wt % or less, or more narrowly 5 wt % or less, based on the total weight of the soda-lime-silica glass.

Soda-lime-silica glass containers have long been produced by a melt processing procedure that produces chemically homogenized, fined, and thermally conditioned molten glass at a viscosity suitable for forming. During conventional melt processing, a glass feedstock or glass batch from which soda-lime-silica glass can be obtained at the right chemistry is fed to a continuous melting furnace. The glass feedstock has conventionally included a physical mixture of virgin raw materials that provides a source of $SiO_2$, $Na_2O$, and CaO in the correct proportions. For example, the virgin raw materials may include corresponding quantities of quartz sand (i.e., crystalline $SiO_2$), soda ash, and limestone as the source of $SiO_2$, $Na_2O$, and CaO, respectively. Other virgin raw materials may also be included in the glass feedstock to provide a source of one or more of $SiO_2$, $Na_2O$, CaO and possibly other oxide and/or non-oxide materials depending on the chemistry of the soda-lime-silica glass being produced. These other virgin raw materials may include feldspar, dolomite, and calumite slag. Additionally, the glass feedstock may include virgin raw materials that provide any of the network formers, network modifiers, colorants, decolorants, redox agents, or other agents listed above as well one or more fining agents such as sodium sulfate ($Na_2SO_4$), carbon, arsenic oxide ($As_2O_3$), antimony oxide ($Sb_2O_3$), tin oxide ($SnO_2$), and/or sodium chloride (NaCl).

The glass feedstock is not limited solely to virgin raw materials. Indeed, recycled glass or "cullet" obtained from post-consumer or industrial waste glass, for example, may be included in the glass feedstock along with the virgin raw materials. The glass feedstock may include up to 80 wt % cullet—with the remainder typically being entirely or mostly virgin raw materials—depending on a variety of factors including the characteristics (color, transparency, etc.) of the soda-lime-glass being manufactured. Cullet is often included in the glass feedstock as shards or particles of previously-formed glass because it can accelerate the melting of the glass feedstock and the reactions that take place within the melting furnace, mainly because the cullet has already been formed into a homogenized glass product, which in turn lowers furnace energy consumption. Other materials such as the glass precursor gel described in US2016/0289114A1 may be included in the glass feedstock in addition to virgin raw materials and, if present, any cullet, and in some instances may even be used exclusively as the glass feedstock.

However composed, and upon being fed to the melting furnace, the glass feedstock mixture is deposited onto a flowing molten glass bath contained in a melting chamber of the furnace at a temperature of about 1450° C. or greater. The material(s) of the glass feedstock melt, react, and progress through several intermediate melt phases before becoming chemically integrated into the flowing molten glass bath as the bath moves by convection through the melting chamber of the furnace towards a fining chamber on the opposite side of a submerged throat where any remaining entrained gas bubbles and inclusions are removed. The fining chamber yields chemically homogenized and adequately fined molten glass having the correct chemistry as needed for further downstream processing into a glass container. At this point, molten glass is removed from the fining chamber of the melting furnace at a temperature of about 1250° C. to 1400° C. and is directed into a forehearth. The forehearth is an extended channel that functions to establish a more uniform temperature profile within the molten glass. The molten glass is cooled to about 1050° C. to 1150° C. in the forehearth and supplied to a glass feeder.

Glass containers are then formed from the conditioned molten glass discharged from the glass feeder at a viscosity in which the glass can be pressed or blown into a container shape. For example, in a standard container-forming process, the molten glass is discharged from the glass feeder as streams of molten glass. The molten glass streams are sheared into individual gobs of a predetermined weight. Each gob falls into a gob delivery system and is directed into a blank mold of an individual section of a glass container forming machine. Once in the blank mold, and with its temperature still at about 1050° C. to 1150° C., the molten glass gob is pressed or blown into a partially-formed container, known as a parison or preform, that includes a tubular wall. As the parison is being pressed or blown into shape, the inside and outside surfaces of the parison wall are chilled to about 750° C.-850° C. through contact with the walls of the blank mold and the plunger (if pressed) or a gas (if blown), while parts of the interior of the wall between the inside and outside surfaces remain significantly hotter, up to about 1000° C.-1100° C. In light of the cooling of the inside and outside surfaces of the parison wall, steep temperature gradients are created within the parison wall from its hot interior portion toward its inside and outside surfaces, thus resulting in glass viscosity variations across the thickness of the parison.

After the blank mold is opened to separate the parison from the blank mold walls, and prior to being blown into a container, the parison is "reheated" for a period of time usually on the order of one to five seconds. During such reheating, heat is conducted outward from the hotter interior portion of the parison wall to the colder inside and outside surfaces of the wall to improve thermal consistency. The parison is reheated in this way so that it can be more easily enlarged into a container shape during the impending blowing operation. In that regard, reheating renders the parison wall as a whole more amenable to viscous flow, which causes the parison wall to elongate under the force of gravity during reheating and to undergo a 10% to 50% increase in length depending on the forming process (e.g., blow and blow, press and blow, narrow-neck press and blow) and the size of the parison. While the "reheating" of the parison just prior to the blowing operation allows for some heat to flow outwards from the interior of the parison wall, thermal equilibrium and an isoviscous state within the parison wall is not attained. The temperature gradients previously-created within the parison wall still exist, albeit not as steep, and may exhibit a maximum temperature differential of at least 150° C., and oftentimes upwards of 200° C. or greater, and sometimes even up to 300° C.

The parison is eventually transferred by an invert arm from the blank mold into a blow mold of the container forming machine for final shaping into a container. The transfer to the blow mold may and often does occur during the "reheating" period of the parison. Once the parison is received in the blow mold and the invert arm has cleared, the blow mold is closed, and the parison is blown rapidly into the final container shape that matches the contour of the mold cavity using a compressed gas such as compressed air. The interior portion of the parison has a temperature that is usually between about 800° C. and 1100° C., or more narrowly between about 900° C. and 1000° C., and the substantial temperature gradients that remain after reheating and the corresponding non-isoviscous state still exist across the parison wall at the time the parison is expanded into the container. As such, when the parison is formed into the glass container, the glass may expand non-uniformly, which leads to the container typically having an inconsistent wall thickness. After being formed, the glass container is allowed to cool while in contact with the mold walls and is then removed from the blow mold and placed on a conveyor or other transport device. The temperature of the glass container upon removal from the blow mold is just below the softening point of the glass. The manufactured glass container is then reheated and cooled at a controlled rate in an annealing lehr to remove residual strain. Any of a variety of coatings may be applied to the surface of the glass container either before (hot-end coatings) or after (cold-end coatings) annealing.

The standard container-forming process described above for soda-lime-silica glass is well-suited for high-output glass container manufacturing facilities. The process is robust and efficient, but not infallible. And apart from glass containers having to be manufactured with more glass than is needed to accommodate variations in the wall thickness of the container and to ensure the container wall meets minimum thickness specifications, glass containers are formed every so often that include unacceptable commercial variances. The circumstances surrounding how the parison is formed and blown can lead to the occurrence of such non-conforming deviations. For instance, as the soda-lime-silica glass is transformed from a glass gob to a parison to a container, the temperature of certain parts of the glass container are decreased on the order of 400° C. over a short time period, usually between two seconds and ten seconds, which consequently increases the viscosity of the glass by about four orders of magnitude over the same period of time. This rapid change in temperature and viscosity occurs while the glass is undergoing numerous motions and contacts with external components such as molds and delivery equipment that locally cool and stiffen the glass. The rapid decrease in temperature of the glass, in combination with the localized cooling that results from external thermal contacts, can cause a small fraction of the produced containers to exhibit cracked finishes, leaning profiles, and out-of-round shapes. Additionally, the parison may deform when being transferred from the blank mold to the blow mold since the temperature of the glass during that motion is greater than the softening point of the glass, which may lead to shape irregularities in some of the produced containers.

The standard container-forming process for soda-lime-silica glass just described details how soda-lime-silica glass is produced in the continuous melting furnace, fined and conditioned in the furnace and a forehearth, and then formed into a glass container at the correct viscosity in the container forming machine. The temperatures provided in the discussion above are generally applicable because those temperatures provide the glass with an appropriate viscosity throughout the process to support container manufacturing—the viscosity of glass is, after all, a function of its temperature and the relationship between viscosity and temperature is known for various different types of glasses. For other types of glasses besides soda-lime-silica glass, the temperatures desired during melting, fining, conditioning, and forming may be different from what is discussed above in order to maintain the same viscosity targets. Borosilicate glass, for example, may also be used to form glass containers, and while the same viscosity targets would apply, particularly during forming, the temperature of the glass associated with such viscosity targets is generally higher than for soda-lime-silica glass. Borosilicate glass, in general and based on the total weight of the glass, includes 70 wt % to 80 wt % $SiO_2$, 7 wt % to 25 wt % $B_2O_3$, 4 wt % to 8 wt % $Na_2O$ or $K_2O$, and 2 wt % to 8 wt % $Al_2O_3$. Moreover, other processes exist to melt, fine, and/or condition glass containers other than those described in conjunction the standard container-forming process described above. Because the present disclosure focuses primarily on a different way to form a glass container of any type of glass in a glass container forming machine, as described in more detail below, the composition of the glass and the manner in which the glass is produced, fined, conditioned, and delivered to a glass container forming machine is not necessarily limited to soda-lime-silica glass and the standard container forming process described above.

SUMMARY OF THE DISCLOSURE

The present disclosure describes a method for forming glass containers using a low-temperature blowing process. In particular, a parison is provided in one of numerous possible ways. The parison includes a tubular wall that has an expandable blow portion. The expandable blow portion is the part of the parison that is outwardly expanded by a compressed gas during blow molding. As part of the presently disclosed method, the expandable blow portion of the parison is blown into a portion of a glass container, but only after the expandable blow portion has achieved a forming viscosity, which, depending on the type of glass, corresponds to a certain temperature range, as well as an isoviscous state. The forming viscosity for soda-lime-silica and other types of glass is between $10^{7.5}$ Pa·s and $10^{5.5}$ Pa·s. And an "isoviscous state" is a state of thermal equilibrium within the expandable blow portion of the tubular wall of the glass parison in which any temperature gradients that are present across the wall translate into a maximum viscosity difference of $10^2$ Pa·s or less; that is, the highest and lowest temperatures found within the expandable blow portion of the tubular wall equate to highest and lowest viscosities that are no greater that $10^2$ Pa·s apart. The isothermal state is preferably defined more narrowly by temperature gradients within the expandable blow portion, if any, that translate into a maximum viscosity difference of $10^{0.5}$ Pa·s or less, or even $10^{0.02}$ Pa·s or less.

The present disclosure embodies a number of aspects that can be implemented separately from or in combination with each other to provide a parison that includes an expandable blow portion having a forming viscosity between $10^{7.5}$ Pa·s and $10^{5.5}$ Pa·s, while also being in an isoviscous state, followed by blow molding the parison into a glass container. According to one aspect of the present disclosure, a method of forming a glass container includes providing a glass parison having a tubular wall that includes an inside surface, which defines an interior parison cavity open at one axial end of the tubular wall, and an outside surface. The tubular wall comprises an expandable blow portion that has a forming viscosity between $10^{7.5}$ Pa·s and $10^{5.5}$ Pa·s and is also in an isoviscous state in which any temperature gradients within the expandable blow portion of the tubular wall of the glass parison translate into a maximum viscosity difference of $10^2$ Pa·s or less. The method further calls for blow molding the glass parison into a glass container by introducing a compressed gas into the interior parison cavity to thereby cause the expandable blow portion of the tubular wall to expand outwardly into a portion of a wall that defines a glass container.

According to another aspect of the present disclosure, a method of forming a glass container involves melting a glass feedstock to produce molten soda-lime-silica glass. A gob of molten soda-lime-silica glass is then delivered to a mold cavity of a blank mold. Next, the gob of molten soda-lime-silica glass is shaped into a glass parison in the mold cavity of the blank mold. The glass parison has a tubular wall that includes an inside surface, which defines an interior parison cavity open at one axial end of the tubular wall, and an outside surface. The tubular wall of the glass parison comprises an expandable blow portion. The method further calls for bringing the expandable blow portion of the glass parison to a forming viscosity between $10^{7.5}$ Pa·s and $10^{5.5}$ Pa·s and also to an isoviscous state in which any temperature gradients within the expandable blow portion of the tubular wall of the glass parison translate into a maximum viscosity difference of $10^2$ Pa·s or less. The glass parison is then blow molded into a glass container by introducing a compressed gas into the interior parison cavity to thereby cause the expandable blow portion of the tubular wall to expand outwardly against an internal mold surface of a mold cavity of a blow mold.

According to yet another aspect of the present disclosure, a method of forming a glass container involves loading a glass parison into a blow mold that defines a mold cavity. The glass parison has a tubular wall that includes an inside surface, which defines an interior parison cavity open at one axial end of the tubular wall, and an outside surface. The tubular wall comprises an expandable blow portion having a forming viscosity between $10^{7.5}$ Pa·s and $10^{5.5}$ Pa·s while also being in an isoviscous state in which any temperature gradients within the expandable blow portion of the tubular wall of the glass parison translate into a maximum viscosity difference of $10^2$ Pa·s or less. The method further calls for introducing a compressed gas into the interior parison cavity of the tubular wall of the glass parison to outwardly expand the expandable blow portion of the tubular wall, thereby forming a glass container from the glass parison. The glass container comprises a wall that provides a main body and a finish rim that extends axially from the main body. A thickness of the wall of the glass container in the main body is less than a thickness of the tubular wall of the glass parison.

DETAILED DESCRIPTION

Figure 1:
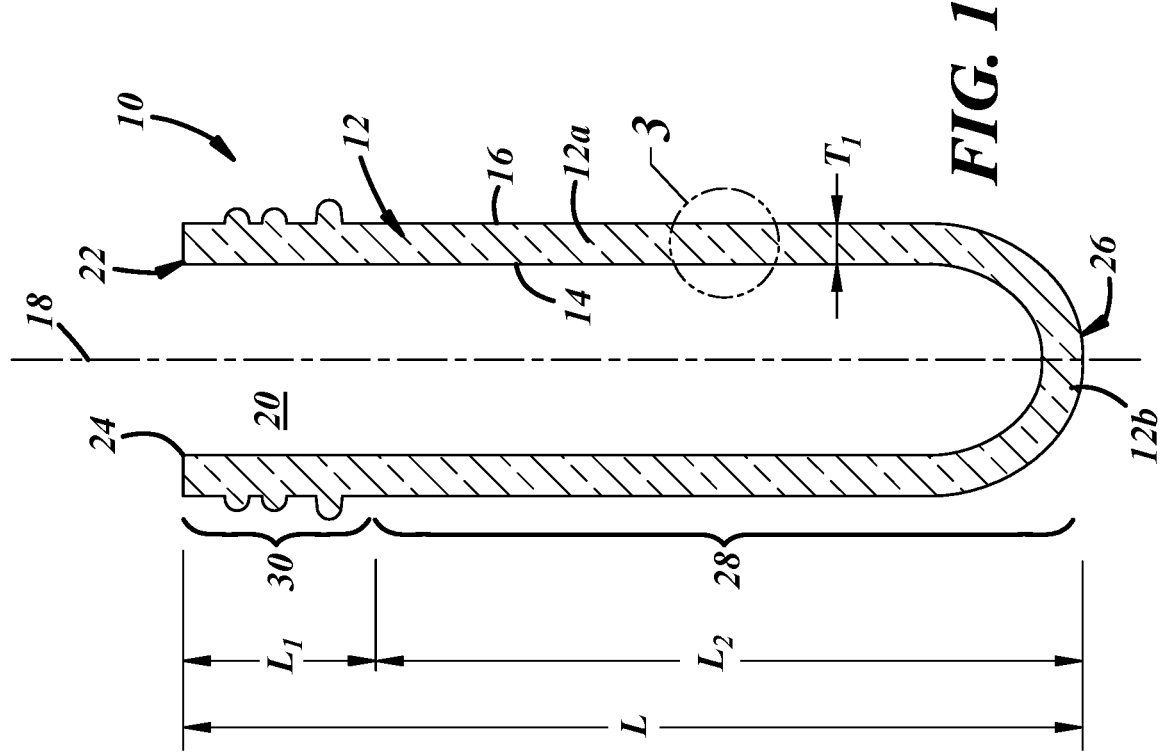
FIG. 1 is cross-sectional view of a glass parison according to one embodiment of the present disclosure.

The present disclosure is directed to a low-temperature blowing process that transforms a glass parison (sometimes referred to as a glass preform) into a glass container. Referring now to FIG. 1, a glass parison 10 having a tubular wall 12 is shown. The tubular wall 12 includes an inside surface 14 and an outside surface 16 and extends longitudinally along a central axis 18. The inside surface 14 defines an interior parison cavity 20 that is open and accessible at an open axial end 22 of the tubular wall 12 through an opening 24 and is closed and covered at an opposite closed axial end 26. The outside surface 16 spans the entire exterior of the tubular wall 12. The tubular wall 12 of the parison 10 thus includes a peripheral side wall 12a and a bottom wall 12b that together provide the inside surface 14 and the opposed outside surface 16. A thickness $T_1$ of the tubular wall 12 is defined by the inside and outside surfaces 14, 16, and a length L of the tubular wall 12 is defined from the open axial end 22 to the closed axial end 26 along the central axis. The parison 10 is a partially-formed glass container that, at least in part, is outwardly expanded at a fairly rapid rate into the glass container of the intended shape and contour by introducing a compressed gas, such as compressed air, into the interior parison cavity 20.

The tubular wall 12 of the glass parison 10 is composed of glass. The chemistry of the glass that constitutes the tubular wall 12 dictates certain thermal properties of the glass including a melting temperature $T_M$, a working temperature $T_W$, a softening temperature $T_{SF}$, and a glass transition temperature $T_G$, as depicted in viscosity-temperature curve depicted in FIG. 2, all of which are indicative of a certain viscosity level of the glass. The melting temperature $T_M$ of the glass is the temperature at which (and above) the glass flows readily, comparable to a liquid, and cannot retain a shape. This temperature may be associated with the temperature at which the viscosity of the glass is 10 Pascal-seconds (Pa·s) (or 100 P). At the working temperature $T_W$, the glass flows, is able to hold a shape temporarily, but deforms readily under its own weight and in response to low to moderate external forces. At the softening temperature $T_{SF}$, the glass flows slowly, is largely able to hold a shape, but will deform over time under its own weight and in response to high external forces. The working temperature $T_W$ and the softening temperature $T_{SF}$ may be the temperatures at which the viscosity of the glass is $10^3$ Pa·s and $10^{6.6}$ Pa·s, respectively. The glass transition temperature $T_G$ is the temperature at which the glass transitions from a rigid vitrified solid that cannot undergo a configurational change to a supercooled liquid that can undergo deformation without fracture because the glass has reached a viscosity where it begins to soften. Macroscopically, the glass does not appear to flow at the glass transition temperature $T_G$. Above, the glass transition temperature $T_G$, stress within the glass can be relieved due to the molecules within the glass having sufficient energy to rearrange. Below the glass transition temperature $T_G$, the glass behaves as an elastic solid. The temperature range between the melting temperature $T_M$ and the glass transition temperature $T_G$ of the glass is generally known as the glass transformation range. The glass transition temperature $T_G$ may be the temperature at which the viscosity of the glass is $10^{11}$ Pa·s to $10^{12.3}$ Pa·s. All of the above-described temperatures $T_M$, $T_W$, $T_{SF}$, $T_G$ are well understood by those knowledgeable in the art of glass chemistry and manufacturing.

Figure 2:
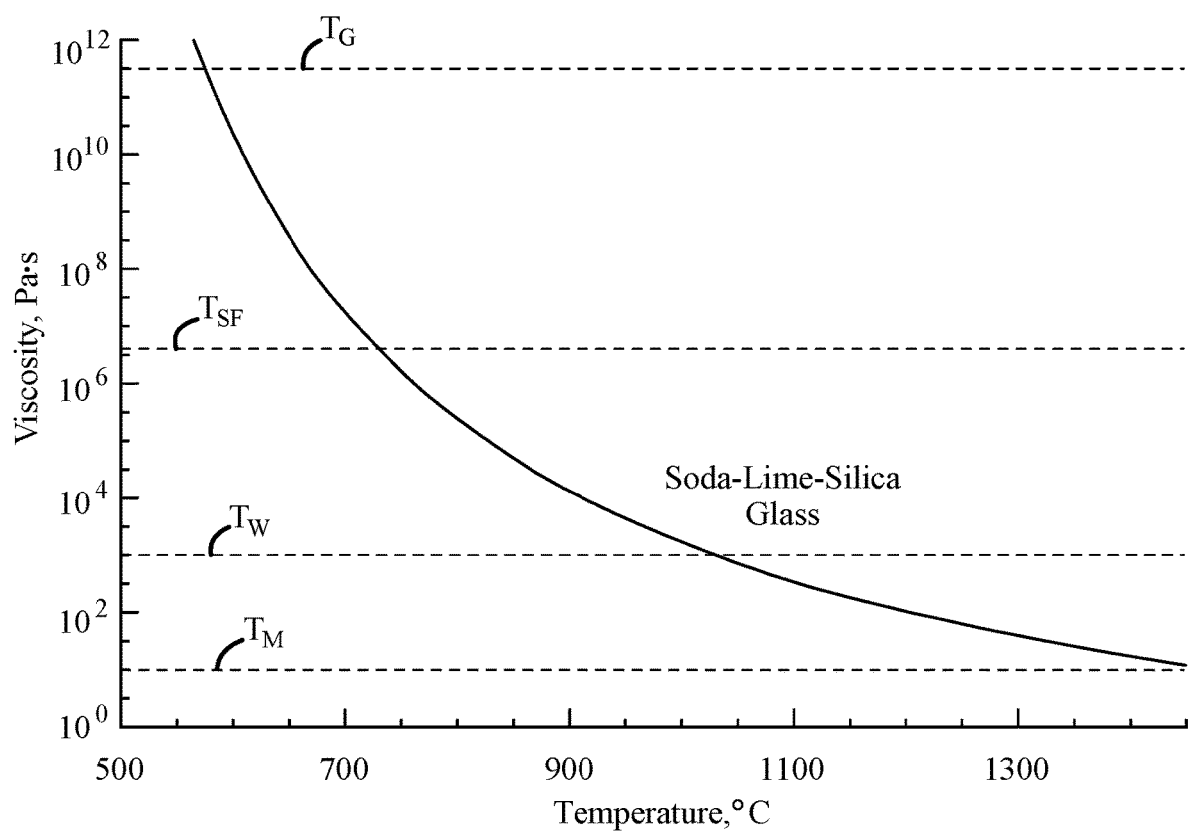
FIG. 2 is viscosity-temperature curve that is representative of soda-lime-silica glass according to one embodiment of the present disclosure.

The glass that constitutes the tubular wall 12 of the glass parison 10 may be soda-lime-silica glass. As described above, soda-lime-silica glass includes 60 wt % to 80 wt % $SiO_2$, 8 wt % to 18 wt % $Na_2O$, and 5 wt % to 15 wt % CaO, based on the total weight of the glass, and may further include other oxide and non-oxide materials including, for example, up to 3 wt % $Al_2O_3$ based on the total weight of the glass. The viscosity-temperature curve of soda-lime-glass depicted in FIG. 2 is representative of soda-lime-silica glass chemistries in general although, depending on the specific glass composition, the curve may be shifted or otherwise slightly altered. In most if not all instances, however, the soda-lime-silica glass that constitutes the tubular wall 12 has a melting temperature $T_M$ between 1400° C. and 1550° C. a working temperature $T_W$ between 950° C. and 1050° C., a softening temperature $T_{SF}$ between 700° C. and 760° C., and a glass transition temperature $T_G$ between 550° C. and 590° C. The soda-lime-silica glass may be colorless or nearly colorless (i.e., flint glass) or it may assume any of a variety of colors including various shades of amber, blue, green, opaque white, red, and black.

The tubular wall 12 of the glass parison 10 includes an expandable blow portion 28 and a finish portion 30. The expandable blow portion 28 is the portion of the tubular wall 12 that is outwardly expanded by the introduction of a compressed gas into the interior parison cavity 20. The expandable blow portion 28 includes the closed axial end 26 of the tubular wall 12 and has a length $L_1$ that extends from the closed axial end 26 towards the open axial end 22 and partially encompasses the length L of the tubular wall 12. The finish portion 30 of the tubular wall 12 retains its shape and is not outwardly expanded by more than a negligible amount along with the expandable blow portion 28. The finish portion 30 includes the open axial end 22 of the tubular wall 12 and has a length $L_2$ that extends from the open axial end 22 towards the closed axial end 26 and partially encompasses the length L of the tubular wall 12. To that end, the sum of the length $L_1$ of the expandable blow portion 28 and the length $L_2$ of the finish portion 30 is equal to the length L of the tubular wall 12, with the length $L_1$ of the expandable blow portion 28 being greater than the length $L_2$ of the finish portion 30.

Figure 3:
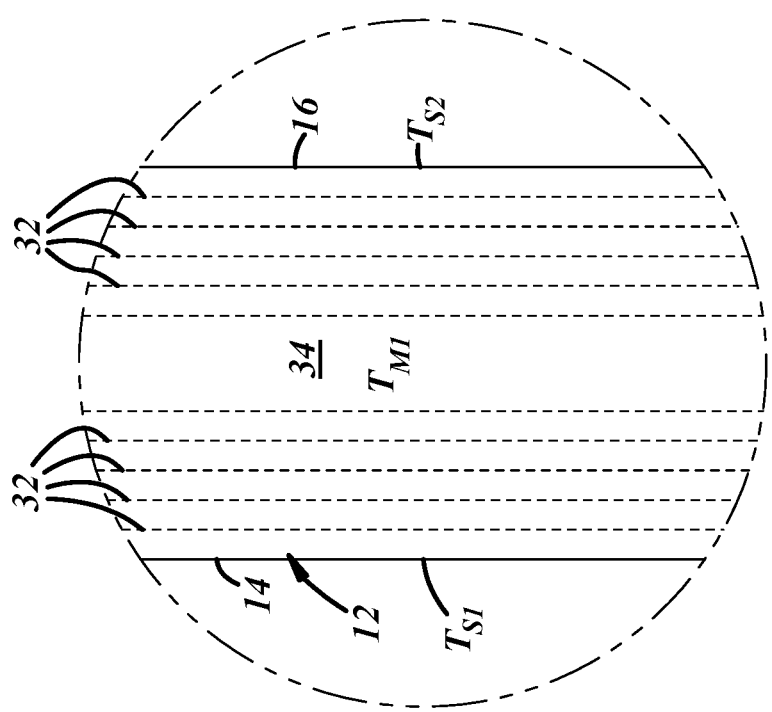
FIG. 3 is a magnified view of the tubular wall of the glass parison shown in FIG. 1 depicting, in general, temperature gradients within the tubular wall of the glass parison.

The expandable blow portion 28 is provided with a specified viscous condition in order facilitate blow molding of the parison 10 into a glass container. Specifically, the "viscous condition" is attained when the expandable blow portion 28 is provided with a forming viscosity between $10^{7.5}$ Pa·s and $10^{5.5}$ Pa·s and is also in an isoviscous state. Additionally, when in the isoviscous state, and as shown generally in FIG. 3, any temperature gradients 32 that are present across the tubular wall 12 between the inside surface 14 and the outside surface 16 translate to a maximum viscosity difference of $10^2$ Pa·s or less or, more narrowly, of $10^{0.5}$ Pa·s or less or even of $10^{0.02}$ Pa·s or less. If temperature gradients are established, for example, the temperature within the tubular wall 12 may have a maximum temperature $T_{M1}$ at a central interior portion 34 of the tubular wall 12 and then gradually decrease in each direction through one or more temperature gradients 32 to an inner skin temperature $T_{S1}$ at the inside surface 14 of the wall 12 and an outer skin temperature $T_{S2}$ at the outside surface 16 of the wall 12. Using soda-lime-silica glass as an example, the tubular wall 12 may be at the forming viscosity of between $10^{7.5}$ Pa·s and $10^{5.5}$ Pa·s when the entire tubular wall is between 680° C. and 790° C., which temperatures correspond to the aforementioned viscosities, respectively, including the maximum temperature $T_{M1}$ and each of the skin temperatures $T_{S1}$, $T_{S2}$. Additionally, the tubular wall 12 may be in an isoviscous state when the difference between the maximum temperature $T_{M1}$ and the lowest temperature within the wall 12, which is typically the lower of the skin temperatures $T_{S1}$, $T_{S2}$ (to the extent those temperatures $T_{S1}$, $T_{S2}$ are different), differs by 100° C. or less (corresponding to a viscosity differential of $10^2$ Pa·s) or, more narrowly, by 20° C. or less (corresponding to a viscosity differential of $10^{0.5}$ Pa·s) or even by 5° C. (corresponding to a viscosity differential of $10^{0.02}$ Pa·s) or less, or when no temperature gradients exist because the wall 12 has attained at a uniform temperature across its thickness $T_1$.

The finish portion 30 may be provided with the same viscous condition as the expandable blow portion 28 (i.e., a viscosity between $10^{7.5}$ Pa·s and $10^{5.5}$ Pa·s and an isoviscous state), but this is not mandatory. The finish portion 30 does not have to achieve the forming viscosity or an isoviscous state since it is not being expanded in the same way as the expandable blow portion 28 during blow molding. To the contrary, the finish portion 30 is preferably maintained at a lower viscosity, such as, for example, at a temperature below the softening temperature $T_{SF}$ of the glass that constitutes the tubular wall 12, to help ensure that the finish portion 30 does not become deformed during the blow molding operation. In one particular embodiment as applicable to soda-lime-silica glass, the finish portion 30 of the tubular wall is maintained between 400° C. and 600° C. or, more narrowly, between 450° C. and 550° C. The finish portion 30 may be held at a lower temperature than the expandable blow portion 28 by a holder that grips the finish portion 30 of the tubular wall 12 both before and during blow molding, as described below, or by any other suitable approach.

Figure 4:
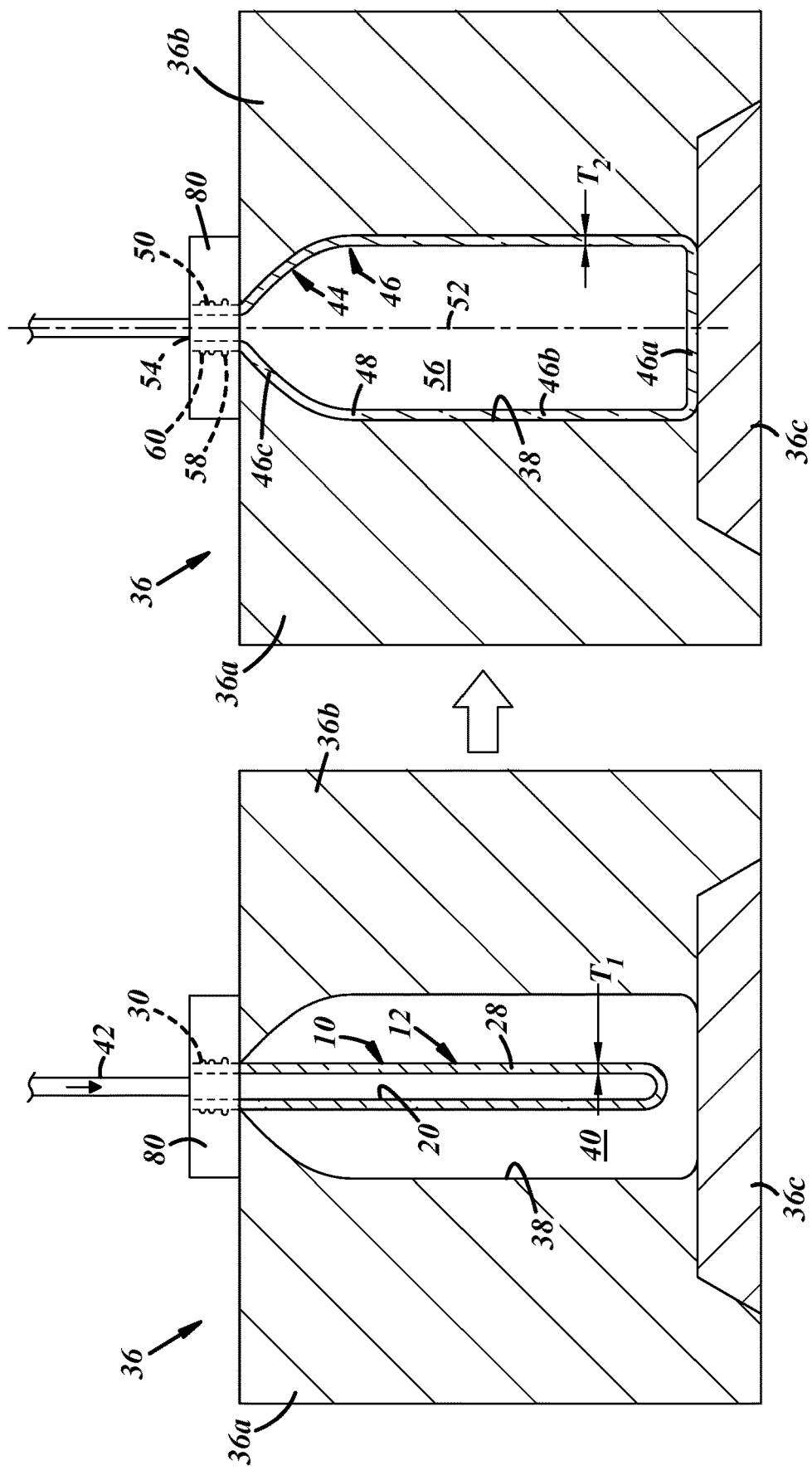
FIG. 4 is an illustration of a blow molding process in which a glass parison is blown into a glass container according to various embodiments of the present disclosure.

The low-temperature blowing process of the present disclosure is shown generally in FIG. 4. To begin, the glass parison 10 is provided with the expandable blow portion 28 of its tubular wall 12 at the forming viscosity and in an isoviscous state. The forming viscosity and the isoviscous state can be achieved in numerous ways, as will be described in more detail below. The glass parison 10 is then blow molded. This involves loading the parison 10 into a blow mold 36 that includes first and second separable mold halves 36a, 36b that, when closed, cooperate with a bottom wall 36c to provide an internal mold surface 38 that defines a mold cavity 40 of the blow mold 36. The glass parison 10 is received in the blow mold 36 such that the expandable blow portion 28 of the tubular wall 12 is contained within the mold cavity 40 and surrounded by the internal mold surface 38. The finish portion 30 of the tubular wall 12, on the other hand, is located outside of the mold cavity 38 either within a confined neck conduit of the blow mold or outside of the blow mold 36 altogether. A compressed gas such as compressed air is then introduced into the interior parison cavity 20 through a blowpipe 42 from a pneumatic supply (not shown). The compressed gas outwardly expands the expandable blow portion 28 of the tubular wall 12 against the internal mold surface 38. The expandable blow portion 28, in turn, assumes a profile that is complimentary to the profile of the internal mold surface 38 as the outside surface 16 of the tubular wall 12 within the expandable blow portion 28 is deformed against that surface 38.

The outward expansion of the expandable blow portion 28 transforms the glass parison 10 into a glass container 44 that includes a glass wall 46. As shown in FIG. 4, the expandable blow portion 28 of the tubular wall 12 of the parison 10 is enlarged into a portion of the wall 46 that constitutes a main body 48 of the glass container 44, and the finish portion 30 of the tubular wall 12 retains its shape and becomes a portion of the wall 46 that constitutes a finish rim 50 of the glass container 44. The main body 48 of the wall 46 includes a bottom wall 46a, an upstanding side wall 46b that extends upwards from a periphery of the bottom wall 46a along a central container axis 52, and optionally a shoulder wall 46c that transitions inwardly from the side wall 46b to the finish rim 50. A thickness $T_2$ of the portion of the wall 46 that provides the main body 48 is less than the thickness $T_1$ of the tubular wall 12 of the parison 10 due to the thinning of the tubular wall 12 that accompanies its outward expansion. The finish rim 50 of the wall 46 extends axially from the main body 48 and defines an opening 54 through which an internal containment space 56 defined by the wall 46 is accessed. The finish rim 50 includes a neck finish (also part of the finish portion 30) that may include a neck bead 58 and at least one exterior surface feature 60, such as a protruding external helical thread, that enables a closure (not shown) to be attached and secured to the container 10 to close the opening 54 to the internal containment space 56.

The pressure of the compressed gas and the blowing time may have to be adjusted compared to conventional practices to compensate for the higher viscosity of the glass parison 10 during the low-temperature blowing process. At the forming viscosity, which is attained at a temperature near the softening point $T_{SF}$ of the glass, the glass of the tubular wall 12 is appreciably stiffer than at conventional blowing temperatures and the viscosity of the glass is much more sensitive to changes in temperature. For example, for soda-lime-silica glass, the forming viscosity of the glass may be between 680° C. and 790° C., which encompasses the softening point of the glass, and the temperature at which such glass is conventionally blown typically ranges from 800° C. to 1100° C. or more narrowly from 900° C. to 1000° C. Despite these issues, the glass is still able to flow and deform under pneumatic pressure so long as the glass has attained the isoviscous state and the blowing conditions are set accordingly. For instance, instead of introducing compressed gas at 30 psi for a duration of 10 milliseconds, as is typical in conventional blowing operations, compressed gas may be introduced into the internal parison cavity 20 of the parison 10 according to the presently disclosed method at 30 psi (206 kPa) to 500 psi (3.5 MPa) for 100 milliseconds to 20 seconds. The higher pressure of the compressed gas and/or the longer blowing time is implemented here to overcome the higher forming viscosity of the glass, which can be 10 times to 10,000 times greater than the viscosity of glass at conventional blowing temperatures.

Blow molding the glass parison 10 into the glass container 44 as described above exploits a different viscosity/temperature profile within the parison 10 during shaping compared to conventional glass forming technology. By blow molding the glass parison 10 when the expandable blow portion 28 of its tubular wall 12 is at the forming viscosity and corresponding lower temperature, the tubular wall 12 flows and thus elongates much slower, if at all, which can improve process stability since the precise timing and motions of the molding equipment and delivery machines are less critical. Moreover, since the expandable blow portion 28 of the tubular wall 12 of the parison 10 is in an isoviscous state, the glass within the expandable blow portion 28 has a greater temperature uniformity just prior to blow molding and the glass does not have a thermal history epitomized by colder and stiffer localized regions caused by contact with molding equipment, delivery machines, and/or other process equipment. As a result, the expandable blow portion 28 does not contain the significant temperature gradients across its thickness $T_1$ that may contribute to unacceptable container variances and process instability. The higher viscosity and lower temperature of the tubular wall 12 also reduces the propensity of the glass to stick to colder metal surfaces including the internal mold surface 38 of the blow mold 36.

The viscous condition can be conferred upon the expandable blow portion 28 of the tubular wall 12 in numerous ways. The glass parison 10 can be provided with the viscous condition by employing certain aspects of traditional melt processing as well as other alternative processing techniques. In one sense, it may be desirable to rely on traditional melt processing up to the point where a parison 10 is pressed or blown from a gob of molten glass as doing so would allow for the continued use of existing glass melting and forming equipment—namely, the continuous melting furnace, forehearth, glass feeder, gob delivery systems, etc.—and related infrastructure when implementing the method of the present disclosure. Of course, other processing routes are certainly feasible, and indeed some of those possible routes are discussed in more detail below, depending on various factors. A general overview three specific approaches in which the glass parison 10 may be provided with the viscous condition in preparation for blow molding are shown in FIG. 5.

Figure 5:
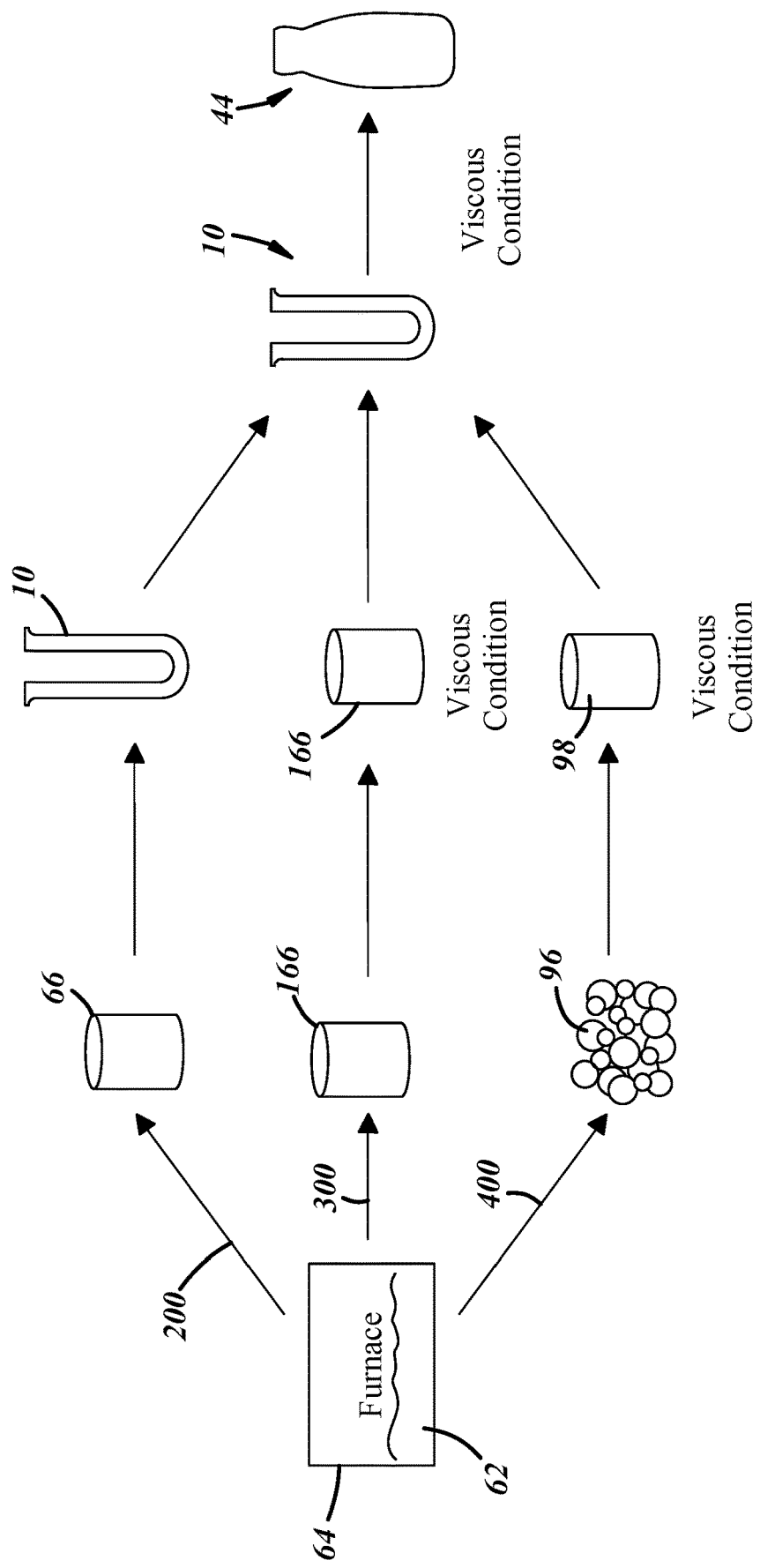
FIG. 5 is a schematic process diagram that depicts various ways in which a glass parison may be provided with an expandable blow portion of its tubular wall having a forming viscosity between $10^{7.5}$ Pa·s and $10^{5.5}$ Pa·s and also being in an isoviscous state.
Figure 6:
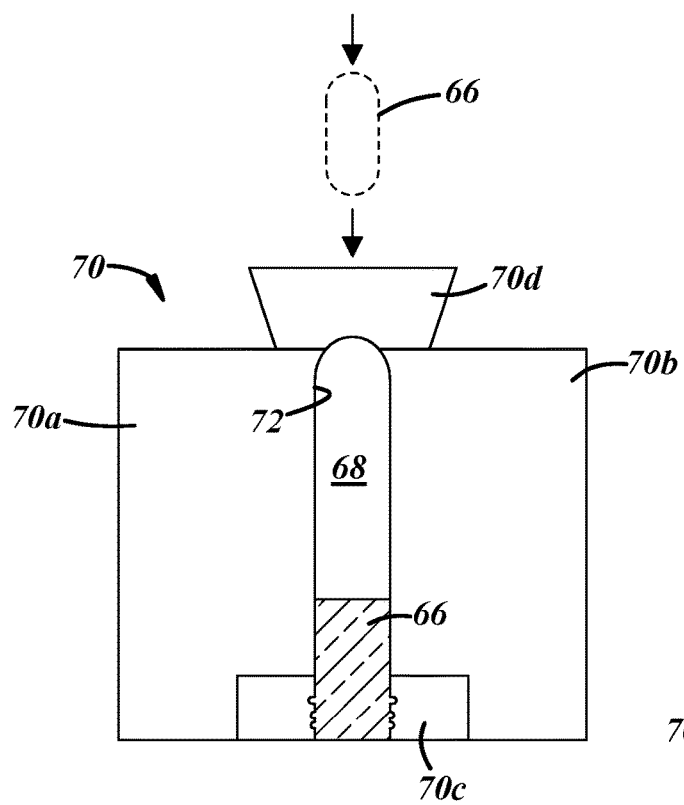
FIG. 6 is an illustration of a blank mold after having received a gob of molten glass according to one embodiment of the present disclosure.

Referring now specifically to FIG. 5 (and also FIGS. 4 and 6-8), a first approach 200 for providing the glass parison 10 with the viscous condition involves producing molten glass 62 in a furnace 64 such as a continuous melting furnace or a submerged combustion melter. The molten glass 62 may be formed by melting a glass feedstock in a melting chamber of the furnace 64. As previously explained, the glass feedstock may be comprised of a physical mixture of virgin raw materials, a physical mixture of virgin raw materials and cullet, a glass precursor gel as described in US2016/0289114A1 alone or in combination with virgin raw materials and/or cullet, or some other feed material that produces molten glass with the correct chemistry when melted. The molten glass 62 is then fined in a refining chamber of the furnace 64 or exterior to the furnace 64 and optionally discharged into a forehearth after undergoing adequate fining if additional conditioning is needed. For soda-lime-silica glass, the temperature of the molten glass upon entering the forehearth usually ranges from 1250° C. to 1400° C. The molten glass experiences controlled heating and cooling in the forehearth to reduce the temperature of the molten glass 62 to below its melting temperature $T_M$ but above its working temperature $T_W$, which, for soda-lime-silica glass, entails cooling the molten glass 62 to 1050° C. to 1150° C.

Upon exiting the forehearth or other structure if no forehearth is employed, a stream of the molten glass 62 is sheared into a gob 66 of the glass by a glass feeder. The glass gob 66, which for soda-lime-silica glass may have a temperature of approximately 1050° C. to 1150° C. when sheared, is delivered by a funnel of a gob delivery system or by another transport device into a mold cavity 68 of a blank mold 70 (FIG. 6) while the temperature of the glass gob 66 is still above the working temperature $T_W$ of the glass. The glass gob 66 is shaped into the glass parison 10 within the blank mold 70. As depicted generally in FIG. 6, the blank mold 70 includes first and second separable mold halves 70a, 70b that, when closed, cooperate with a neck ring 70c and a baffle 70d to provide an internal mold surface 72 that defines the mold cavity 68 of the blank mold 70. The glass gob 66 is blown downwards and pressed into the neck ring 70c by a compressed gas, typically compressed air, as part of a settleblow process. The neck ring 70c is sized and profiled to shape the received molten glass into the finish portion 30 of the impending tubular wall 12 of the glass parison 10. Specifically, the neck ring 70c presents the finish portion 30 of the impending tubular wall 12 with at least the neck finish that is planned for the finish rim 50 of the glass container 44, while the remainder of the molten glass above the neck ring 70c awaits further shaping into the expandable blow portion 28.

Figure 7:
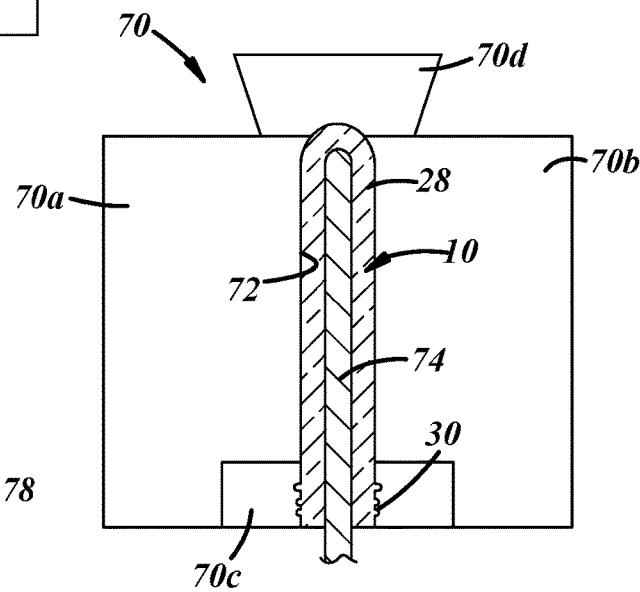
FIG. 7 is an illustration of a blank mold in which a glass parison may be shaped by pressing the glass with a retractable plunger according to various embodiments of the present disclosure.

After the glass gob 66 has been settleblown, the glass is shaped into the parison 10 by a pressing or blowing operation. As shown in FIG. 7, for example, a retractable plunger 74 is inserted through the neck ring 70c into the mold cavity 68 of the blank mold 70. The plunger 74 presses and conforms the glass against the internal mold surface 72 to form the expandable blow portion 28 and, thus, completes the shaping of the glass into the glass parison 10. Alternatively, instead of pressing, a blow pin may be inserted through the neck ring 70c and into the molten glass. A compressed gas is then discharged into the molten glass through the blow pin to blow the glass against the internal mold surface 72 to form the expandable blow portion 28. Once the glass parison 10 has been formed, the plunger 74 (or blow pin) is retracted and the mold halves 70a, 70b are separated. At this point, the interior portion 34 of the tubular wall 12 may have a temperature between 800° C. and 1100° C., which is the maximum temperature $T_{M1}$ of the wall 12, and significant temperature gradients 32 of 150° C. or greater, or even at least 200° C. or greater, usually exist from the hotter interior portion 34 towards the colder inside and outside surfaces 14, 16 of the wall 12.

The expandable blow portion 28 of the tubular wall 12 of the glass parison 10 is then brought to the forming viscosity and an isoviscous state. Several avenues exist for doing so. For example, in one embodiment, the glass parison 10 may first be cooled to a temperature below the glass transition temperature $T_G$ of the glass, which, for soda-lime-silica glass, typically lies between 550° C. and 590° C. This means that the temperature of the tubular wall 12 is reduced entirely below the glass transition temperature $T_G$ of the glass including the maximum temperature $T_{M1}$ and each of the skin temperatures $T_{S1}$, $T_{S2}$ of the tubular wall 12. The glass parison 10 is preferably cooled to room temperature (20° C. at standard pressure) and held there for any amount of time. Cooling the glass parison 10 to room temperature allows the parison 10 to be readily handled, stored, and/or transported with case. Eventually, at some point in the future, the glass parison 10 is heated from the temperature below the glass transition temperature $T_G$ of the glass to a temperature that brings at least the expandable blow portion 28 of the tubular wall 12 to the forming viscosity and also to an isoviscous state. Such heating of the glass parison 10 can be performed in any feasible manner.

Figure 8:
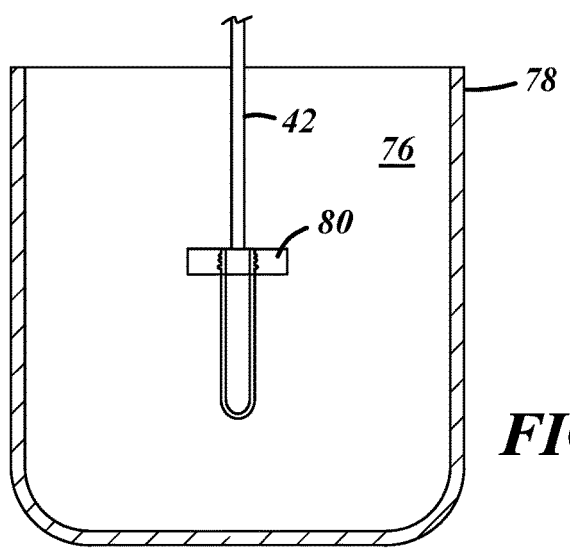
FIG. 8 depicts a heating chamber for bringing (via heating or cooling) the expandable blow portion of a tubular wall of a glass parison to a forming viscosity between $10^{7.5}$ Pa·s and $10^{5.5}$ Pa·s and also to an isoviscous state according to various embodiments of the present disclosure.

The glass parison 10 may be heated to bring the expandable blow portion 28 of the tubular wall 12 of the glass parison 10 to the forming viscosity, and also to an isoviscous state, in a heating chamber 76 of a heating vessel 78 such as an oven or a lehr, as depicted in FIG. 8. As shown, the glass parison 10 may be griped by a holder 80 that circumferentially engages and applies an inward radial pressure to the finish portion 30 of the tubular wall 12. The blowpipe 42 may be centrally received by the holder 80 and configured to deliver compressed gas through the holder 80 and into the internal parison cavity 20 of the glass parison 10. Once gripped by the holder 80, the parison 10 and the holder 80 may be positioned within the heating chamber 76 and heated to the viscous condition. The heating chamber 76, for example, may be maintained at a temperature corresponding to the forming viscosity, such as a temperature between 680° C. and 790° C. for soda-lime-silica glass, and the glass parison 10 may be held in the heating chamber 76 until the expandable blow portion 28 achieves the same temperature with sufficiently reduced thermal gradients as needed to attain an isoviscous state. As another option, the heating chamber 76 may be maintained at a temperature above that which corresponds to the forming viscosity, such as above 800° C. for soda-lime-silica glass, to initially heat the glass parison 10 quickly. The temperature of the heating chamber 76 may then be reduced to a temperature corresponding to the forming viscosity, such as a temperature between 680° C. and 790° C. for soda-lime-silica glass, once the glass parison 10 is close to or within that range followed by holding the glass parison 10 in the chamber 10 until an isoviscous state is attained in the expandable blow portion 28.

The amount of time it takes for the expandable blow portion 28 to achieve the forming viscosity and for any established temperature gradients 32 to subside can vary based on a number of factors including the thickness $T_1$ of the tubular wall 12, the length L of the tubular wall 12, the chemistry of the glass, and the temperature maintained in the heating chamber 76. There is generally no upper time limit for how long the glass parison 10 can be held in the heating chamber 76 while the temperature corresponding to the forming viscosity is maintained, although unnecessarily long heating times may adversely affect the efficiency of the overall process. And while the expandable blow portion 28 of the tubular wall 12 is ultimately heated to the viscous condition, the finish portion 30 of the tubular wall 12 is not required to be heated in the same way. Indeed, as mentioned above, the temperature of the finish portion 30 of the tubular wall 12 is preferably kept below the softening point $T_{SF}$ of the glass, such as at a temperature between 400° C. and 600° C. for soda-lime-silica glass, to help ensure that the finish portion 30 retains its shape. The finish portion 30 may be maintained at a temperature below that of the expandable blow portion 28 while the glass parison 10 is held in the heating chamber 76 by circulating a cooling fluid such as air through the holder 80 to extract heat from the finish portion 30 as needed.

The glass parison 10 may be carried by the holder 80 from the heating chamber 76 to the blow mold 36 for blow molding. In fact, the holder 80 may orient and load the glass parison 10 into the mold cavity 40 of the blow mold 36, as illustrated in FIG. 4. With the glass parison 10 in place and the holder 80 still engaged with the finish portion 30 of the tubular wall 12, and with the blowpipe 42 in fluid communication with the internal parison cavity 20, the blow molding process may proceed by introducing a compressed gas into the internal parison cavity 20 in the manner described above in connection with FIG. 4. The holder 80 may thus have several functions that include: (1) transporting the glass parison 10 into and out of the heating chamber 76 and into and out of the blow mold 36 and (2) managing the temperature of the finish portion 30 of the tubular wall 12 of the glass parison 10 during heating/cooling of the expandable blow portion 28 in the heating chamber 76 and during the outward expansion of the expandable blow portion 28 in the blow mold 36. Of course, other techniques may be used to achieve these functions in lieu of the holder 80 including, for example, the use of standard or modified invert arm assembly.

Cooling the glass parison 10 to room temperature prior to forming enables the parison 10 to be blow molded into the glass container 44 at a later time and/or a different location. For example, the glass parison 10 may be shaped in the blank mold 70 at one facility, cooled to room temperature, and then transported to a different facility. The glass parison 10 may be stored at the latter facility and, at some point, transformed into the glass container 44 in the blow mold 36 by way of blow molding. Accordingly, and in contrast to the standard container-forming process, the blank mold 70 and the blow mold 36 are not required to be located in close proximity to one another so that the glass parison 10 can be transferred directly from the blank mold 70 to the blow mold 36 moments after being shaped in the blank mold 70. This also means that certain downstream processing equipment such as an annealing lehr, conveyors, inspection equipment, and packaging equipment may operate at the facility that contains the blow mold 36 and not the blank mold 70. The option to divide the equipment needed to manufacture a glass container amongst different facilities introduces design flexibility into the overall process that can be exploited to enhance economic efficiency.

Another embodiment within the first approach 200 for bringing the expandable blow portion 28 of the tubular wall 12 of the glass parison 10 to the forming viscosity and an isoviscous state does not involve reducing the temperature of the glass parison 10 to a temperature below the glass transition temperature $T_G$ of the glass. Rather, after the molten glass gob 66 is shaped into the glass parison 10 in the blank mold 70, the parison 10 may be cooled to bring the expandable blow portion 28 of the tubular wall 12 to the forming viscosity and also to an isoviscous state. This can be accomplished by positioning the glass parison 10—in which, for soda-lime-silica glass, the interior portion 34 of the tubular wall 12 typically has a temperature of 800° C. to 1100° C. and significant temperature gradients of 150° C. or greater, or even 200° C. or greater, usually exist from the hot interior portion 34 toward the colder inside and outside surfaces 14, 16 of the wall 12—into the heating chamber 76 in the same way as described above and shown in FIG. 8. To that end, the holder 80 may grip the finish portion 30 of the glass parison 10 and hold the parison 10 inside the heating chamber 76, which may be maintained at a temperature corresponding to the forming viscosity until the expandable blow portion 28 of the tubular wall 12 reaches the same temperature and any established temperature gradients 32 subside. The finish portion 30 of the tubular wall 12 may be cooled by the holder 80 as previously described to reduce its temperature even further and, in particular, to a temperature below the softening temperature $T_{SF}$ of the glass.

Referring back to FIG. 5 (and also FIGS. 9-11), a second approach 300 for providing the glass parison 10 with the viscous condition involves producing molten glass 62 in a furnace 64, such as a continuous melting furnace or a submerged combustion melter, in the same way as previously described in the first approach 200. Upon exiting the forehearth or other structure if no forehearth is employed, a stream or runner of the molten glass 62 is sheared into a gob 166 of the molten glass by a glass feeder, also in the same way as previously described. The glass gob 166, at least for soda-lime-silica glass, has a temperature of 1050° C. to 1150° C. when sheared. In this embodiment, however, instead of delivering the glass gob 166 into a blank mold at a temperature above the working temperature $T_W$ of the glass and shaping the settleblown glass into the glass parison 10, the glass gob 166 is itself brought to the forming viscosity and also to an isoviscous state. After the glass gob 166 attains the viscous condition, the gob 166 is shaped into the glass parison 10 that, upon formation, retains the viscous condition.

The glass gob 166 may be brought to the viscous condition in one of several ways. In one embodiment, the glass gob 166 may be cooled to a temperature below the glass transition temperature $T_G$ of the glass, which, for soda-lime-silica glass, lies between 550° C. and 590° C. The glass gob 166 is preferably cooled to room temperature (20° C. at standard pressure) and held at that temperature for any amount of time. The potential benefits of cooling the glass gob 166 to room temperature are the same as noted above in the first approach 200 although, here, it may be easier to store and transport the glass gob 166 since it is less delicate than the fully-shaped glass parison 10 at the same temperature. Eventually, at some point in the future, the glass gob 166 is heated from the temperature below the glass transition temperature $T_G$ of the glass to bring it to the forming viscosity and also to an isoviscous state. Alternatively, another embodiment within the second approach 300 for bringing the glass gob 166 to the viscous condition does not involve reducing the temperature of the gob 166 to a temperature below the glass transition temperature $T_G$ of the glass. Rather, after being sheared from a molten glass runner, the glass gob 166 is cooled to bring the gob 166 to the forming viscosity and also to an isoviscous state.

The heating or cooling of the glass gob 166 to the viscous condition may occur in the heating chamber 76 illustrated in FIG. 8 in the same way as described for the heating and cooling of the glass parison 10. In particular, the glass gob 166 may be placed in the heating chamber 76, which may be maintained at a temperature corresponding to the forming viscosity, until the gob 166 achieves the same temperature with sufficiently reduced thermal gradients as needed to attain an isoviscous state, whether by heating the gob 166 from a temperature below the glass transition temperature $T_G$ of the glass or cooling the gob 166 from a temperature above the working temperature $T_W$ of the glass. The amount of time needed to heat/cool the gob 166 to the forming viscosity and for any established temperature gradients 32 to subside may vary. Additionally, the use of the holder 80 depicted in FIGS. 4 and 8 is generally not needed since the entire gob 166 is heated/cooled to the same extent.

Figure 9:
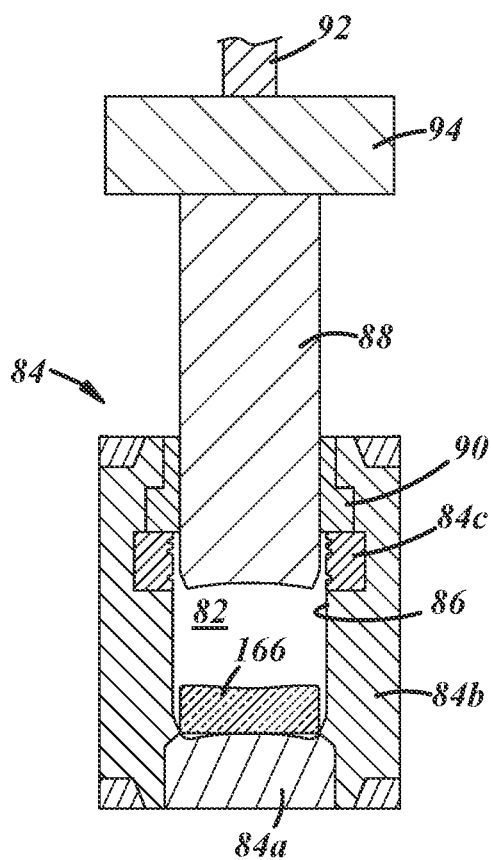
FIG. 9 is a side cross-sectional view of a hot-stamping apparatus for use in shaping a glass gob or a solid glass monolith into a glass parison according to various embodiments of the present disclosure with a retractable plunger not yet in contact with the gob/monolith that has been loaded into a mold cavity of the hot-pressing apparatus.
Figure 11:
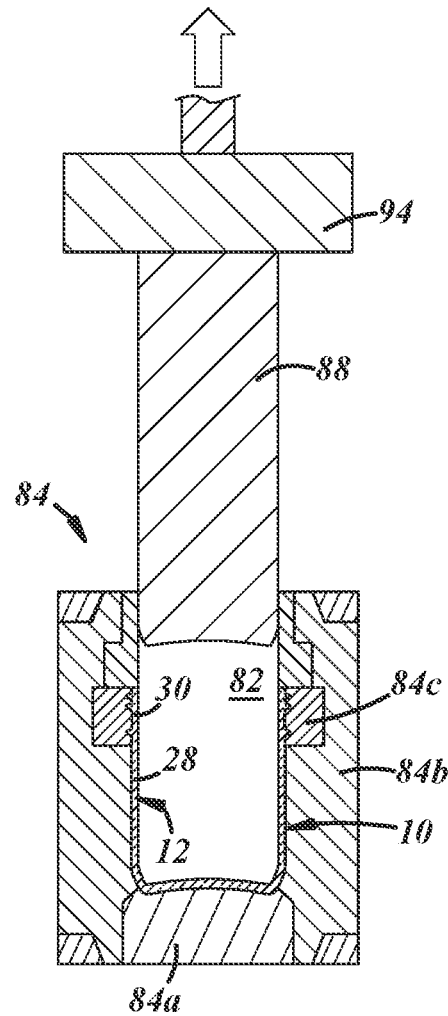
FIG. 11 is a side cross-sectional view of the hot-stamping apparatus of FIG. 9 showing the glass parison following retraction of the plunger according to various embodiments of the present disclosure.
Figure 10:
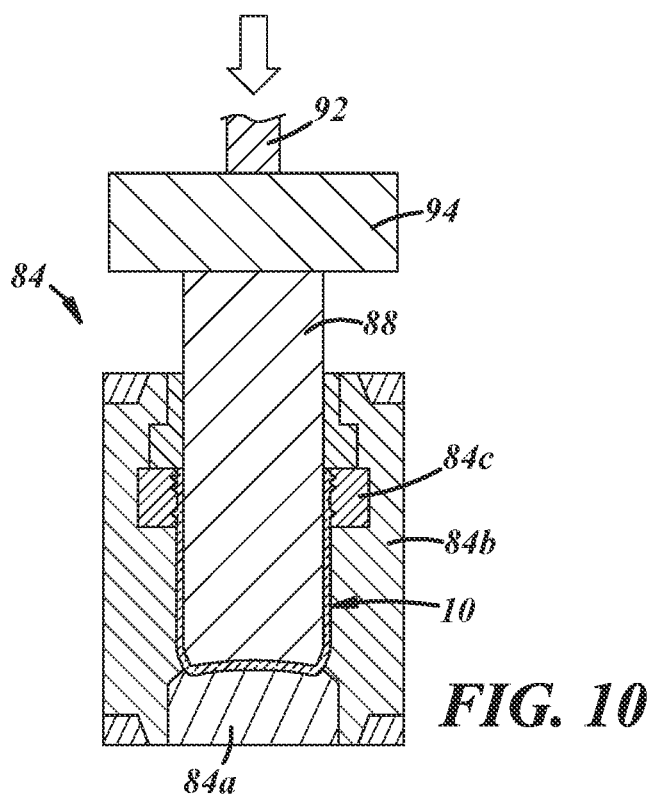
FIG. 10 is a side cross-sectional view of the hot-stamping apparatus of FIG. 9 showing the glass gob or solid glass monolith being mechanically deformed by the plunger into the glass parison according to various embodiments of the present disclosure.

Once the glass gob 166 has achieved the viscous condition, and as shown in FIGS. 9-11, the gob 166 is shaped into the glass parison 10 while preserving the viscous condition. This can be accomplished by hot-stamping. Hot-stamping is a preferred choice for shaping the glass gob 166 into the glass parison 10 since it can be operated to minimize or altogether prevent unintended heat loss from the glass as it is transformed from the gob 166 into the glass parison 10. Hot-stamping is initiated, as shown in FIG. 9, by introducing the glass gob 166 into a mold cavity 82 of a hot-stamping apparatus 84. An internal mold surface 86 of the mold cavity 82 may be defined by a bottom plate 84a, an upstanding side wall 84b that is affixed to and surrounds a circumference of the bottom plate 84a, and a neck ring 84c disposed within the upstanding side wall 84b to provide an upper part of the mold surface 86. Similar to the blank mold 36 described earlier, the neck ring 84c in the hot-stamping apparatus 84 is sized and profiled to shape any received glass into the finish portion 30 of the impending tubular wall 12 of the glass parison 10, which includes forming at least the neck finish that is planned for the finish rim 50 of the glass container 44. The rest of the internal mold surface 86 shapes the glass into the expandable blow portion 28 of the tubular wall 12.

Once the glass gob 166 is received in the mold cavity 82 of the hot-stamping apparatus 84, a retractable mandrel 88 is inserted into the mold cavity 82 while being centrally guided by a guide ring 90 located adjacent to the opening of the mold cavity 82. The mandrel 88 is advanced against the glass gob 166 within the mold cavity 82 to force the gob 166 to deform up and around the mandrel 88 so as to occupy the available space between the mandrel 88 and the internal mold surface 86 established by the bottom plate 84a, the upstanding side wall 84b, and the neck ring 84c, as shown in FIG. 10. To accomplish mechanical deformation of the glass gob 166 at an acceptable deformation rate, the bottom plate 84a and the side wall 84b of the hot-stamping apparatus 84 may be maintained at a temperature corresponding to the forming viscosity, such as a temperature between 680° C. and 790° C. for soda-lime-silica glass. The forcible downward pressure applied by the mandrel 88 may be delivered by a hydraulic actuator 92 that acts on the mandrel 88 through a ram extender 94. After the glass gob 166 has been deformed into the glass parison 10, the mandrel 88 is retracted, as shown in FIG. 11, and the parison 10 is removed from the hot-stamping apparatus 84. The glass parison 10 may then be carried by the holder 80 depicted in FIGS. 4 and 8, for example, from the hot-stamping apparatus 84 to the blow mold 36 for blow molding in the manner described above.

Referring again back to FIG. 5 (and also FIGS. 12-14), a third approach 400 for providing the glass parison 10 at the viscous condition involves producing molten glass 62 in a furnace 64 such as a continuous melting furnace or a submerged combustion melter in the same way as previously described in the first and second approaches 200, 300. In this embodiment, however, the molten glass 62 is not sheared into a glass gob 66, 166 but, rather, is quenched into glass frit 96 or particles of glass. The molten glass 62 can be quenched into glass frit 96 by pouring the molten glass 62 into water. The resultant frit 96 has a temperature below the glass transition temperature $T_G$ of the glass, which, for soda-lime-silica glass, lies between 550° C. and 590° C., and is preferably cooled to room temperature (20° C. at standard pressure) to facilitate storage, transportation, or other handling. Eventually, at some point in the future, the glass frit 96 is sintered into a solid glass monolith 98 that has the forming viscosity and is also at an isoviscous state, followed by shaping of the solid glass monolith 98 into the glass parison 10.

The glass frit 96 may be sintered into the solid glass monolith 98 having the viscous condition by, for example, compacting the glass frit 96 in a die-pressing apparatus 100 to form a compressed green body 102, as shown in FIGS.

Figure 12:
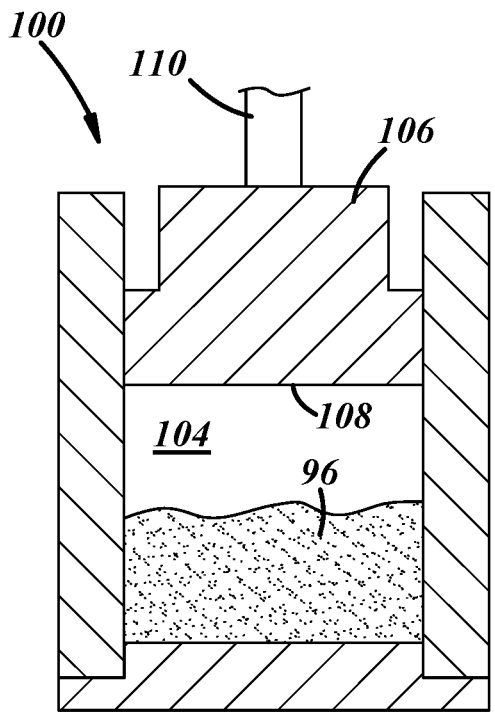
FIG. 12 is a side cross-sectional view of die-pressing apparatus for use in compressing glass frit into a compressed green body according to one embodiment of the present disclosure with a retractable piston head not yet in pressing contact with glass frit that has been loaded into a die cavity of the die-pressing apparatus.
Figure 13:
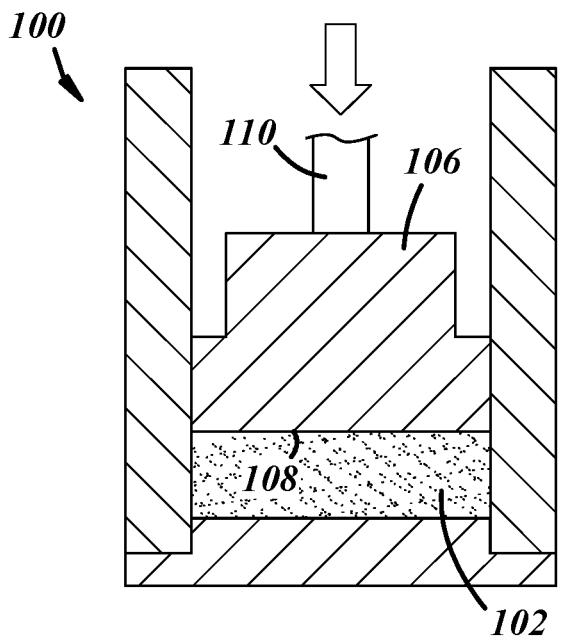
FIG. 13 is a side cross-sectional view of the die-pressing apparatus of FIG. 12 showing the glass frit being pressed by the piston head into the compressed green body according to one embodiment of the present disclosure.
Figure 14:
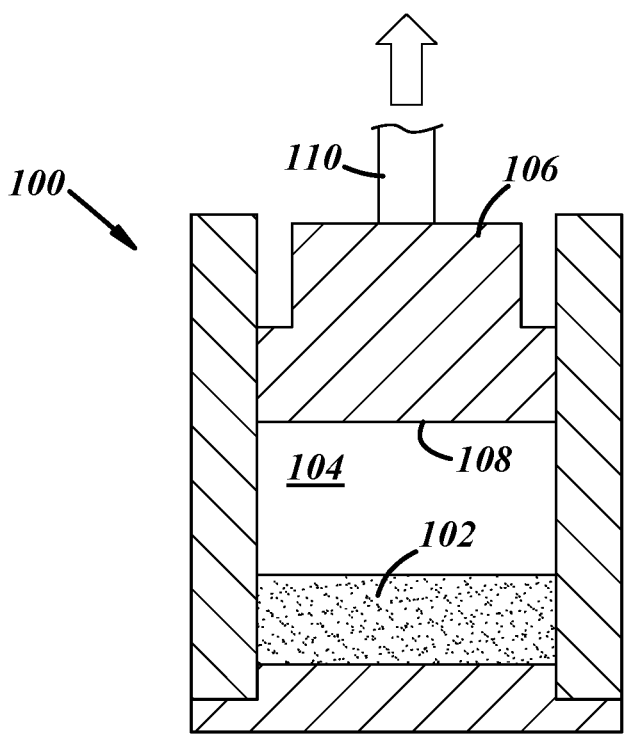
FIG. 14 is a side cross-sectional view of the die pressing apparatus of FIG. 12 showing the compressed green body of the glass frit following retraction of the piston head according to one embodiment of the disclosure.

12-14, followed by heating the compressed green body 102. Referring now to FIG. 12, the glass frit 96 is loaded into a die cavity 104 of the die-pressing apparatus 100, and a retractable piston head 106 is advanced within the die cavity 104 to bring a front surface 108 of the piston head 106 into pressed engagement with the glass frit 96. The piston head 106 is pressed against the glass frit 96 at an applied downward pressure of, preferably, 25 MPa to 100 MPa for a time of 30 seconds to 5 minutes using a hydraulic actuator 110. The compressive force applied by the piston head 106 compacts the glass frit 96 into the compressed green body 102, as shown in FIG. 13, which is held together in a weak, yet portable, physically consolidated mass. After the required compression has been achieved, the piston head 106 is retracted, as shown in FIG. 14, and the compressed green body 102 is removed from the die-pressing apparatus 100.

The compressed green body 102 of the glass frit 96 is then sintered into the solid glass monolith 98 of approximately the same shape in a belt-type furnace or some other heating device. The sintering process includes heating the compressed green body 102 to a sintering temperature at which the green body 102 can fuse together in the solid state without melting the glass frit. For example, in the context of soda-lime-silica glass, the compressed green body 102 may be may be heated at a rate of 10° C./min to 20° C./min until it reaches a sintering temperature between 600° C. to 900° C. or, more narrowly, between 700° C. to 750° C., at which point the green body 102 (a term which includes any transition phase between the green body 102 and the solid glass monolith 98) may be held at the sintering temperature for a period of 1 minute to 60 minutes. As such, the solid glass monolith 98 that results from sintering is unitary block of a heated glass. And, to the extent that the solid glass monolith 98 is not yet achieved the viscous condition, the glass monolith 98 may be heated/cooled in the heating chamber 76 illustrated in FIG. 8 in the same way as described for the glass gob 166 of the second approach 300 until the correct forming viscosity and an isoviscous state are reached.

The solid glass monolith 98 is then shaped into the glass parison 10, while preserving the viscous condition, by practicing the same hot-stamping operation described above in connection with FIGS. 9-11. That is, the solid glass monolith 98 is introduced into the mold cavity 82 of the hot-stamping apparatus 84 and mechanically deformed by the mandrel 88 so that the glass occupies the available space between the mandrel 88 and the internal mold surface 86 established by the bottom plate 84a, the upstanding side wall 84b, and the neck ring 84c, as shown in FIG. 10. The hot-stamping apparatus 84 may be maintained at a temperature corresponding to the forming viscosity while the glass parison 10 is being shaped. After the solid glass monolith 98 has been deformed into the glass parison 10, the mandrel 88 is retracted, as illustrated in FIG. 11, and the parison 10 is removed from the hot-stamping apparatus 84. The glass parison 10 may then be carried by the holder 80 depicted in FIGS. 4 and 8, for example, from the hot-stamping apparatus 84 to the blow mold 36 for blow molding in the manner described above.

There thus has been disclosed a method of blow molding a glass parison at an unconventionally low temperature into a glass container that satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of forming a glass container, the method comprising:
   providing a glass parison having a tubular wall that includes an inside surface, which defines an interior parison cavity open at one axial end of the tubular wall, and an outside surface, the tubular wall comprising an expandable blow portion having a forming viscosity between $10^{7.5}$ Pa·s and $10^{5.5}$ Pa·s and also being in an isoviscous state in which any temperature gradients within the expandable blow portion of the tubular wall of the glass parison translate into a maximum viscosity difference of $10^2$ Pa·s or less; and
   blow molding the glass parison into a glass container by introducing a compressed gas into the interior parison cavity while the expandable blow portion of the tubular wall has the forming viscosity and is in the isoviscous state to thereby cause the expandable blow portion of the tubular wall to expand outwardly into a portion of a wall that defines a glass container.

2. The method set forth in claim 1, wherein the tubular wall of the glass parison further includes a finish portion adjacent to an opening of the interior parison cavity, and wherein the finish portion of the tubular wall is not outwardly expanded during blow molding of the glass parison but instead retains a finish portion shape to provide a finish rim of the glass container.

3. The method set forth in claim 2, wherein the finish portion has a temperature that is less than a temperature of the expandable blow portion when the expandable blow portion is in the isoviscous state.

4. The method set forth in claim 1, wherein any temperature gradients within the expandable blow portion of the tubular wall translate into a maximum viscosity difference of $10^{0.5}$ Pa·s or less.

5. The method set forth in claim 1, wherein any temperature gradients within the expandable blow portion of the tubular wall translate into a maximum viscosity difference of $10^{0.02}$ Pa·s or less.

6. The method set forth in claim 1, wherein the glass parison is comprised of soda-lime-silica glass that includes 60 wt % to 80 wt % $SiO_2$, 8 wt % to 18 wt % $Na_2O$, and 5 wt % to 15 wt % CaO.

7. The method set forth in claim 6, wherein the soda-lime-silica glass of the glass parison further includes aluminum oxide in an amount up to 3 wt %.

8. The method set forth in claim 1, wherein providing the glass parison further comprises:
   producing molten glass that is composed of a glass having glass transition temperature;
   delivering a gob of glass obtained from the molten glass to a mold cavity of a blank mold;
   shaping the gob of glass into the glass parison in the mold cavity of the blank mold by either pressing the gob of glass with a plunger or blowing the gob of glass with a compressed gas;
   cooling the glass parison to a temperature below the glass transition temperature of the glass; and
   heating the glass parison from the temperature below the glass transition temperature of the glass to bring the expandable blow portion of the tubular wall of the glass parison to a temperature corresponding to the forming viscosity and also to the isoviscous state.

9. The method set forth in claim 1, wherein providing the glass parison further comprises:
producing molten glass that is composed of a glass having a glass transition temperature;
delivering a gob of glass obtained from the molten glass to a mold cavity of a blank mold;
shaping the gob of glass into the glass parison in the mold cavity of the blank mold by either pressing the gob of glass with a plunger or blowing the gob of glass with a compressed gas; and
cooling the glass parison to bring the expandable blow portion of the tubular wall of the glass parison to a temperature corresponding to the forming viscosity and also to the isoviscous state.

10. The method set forth in claim 1, wherein providing the glass parison further comprises:
producing molten glass that is composed of a glass having a glass transition temperature;
obtaining a gob of glass from the molten glass;
bringing the gob of glass to a temperature corresponding to the forming viscosity and also to the isoviscous state; and
shaping the gob of glass while at the forming viscosity and also at the isoviscous state to form the glass parison.

11. The method set forth in claim 10, wherein bringing the gob of glass to the temperature corresponding to the forming viscosity and also to the isoviscous state comprises:
cooling the gob of glass to a temperature below the glass transition temperature of the glass; and
heating the gob of glass from the temperature below the glass transition temperature of the glass to the temperature corresponding to the forming viscosity and also to the isoviscous state.

12. The method set forth in claim 10, wherein bringing the gob of glass to the temperature corresponding to the forming viscosity and also to the isoviscous state comprises:
cooling the gob of glass to the temperature corresponding to the forming viscosity and also to the isoviscous state.

13. The method set forth in claim 10, wherein shaping the gob of glass into the glass parison comprises hot-pressing the gob of glass into the glass parison.

14. The method set forth in claim 1, wherein providing the glass parison further comprises:
producing molten glass that is composed of a glass having a glass transition temperature;
quenching a portion of the molten glass to form glass frit having a temperature below the glass transition temperature of the glass;
sintering the glass frit to form a solid glass monolith that has a temperature corresponding to the forming viscosity and is also at the isoviscous state;
shaping the solid glass monolith while at the forming viscosity and also at the isoviscous state to form the glass parison.

15. The method set forth in claim 14, wherein shaping the solid glass monolith into the glass parison comprises hot-stamping the solid glass monolith into the glass parison.

16. A method of forming a glass container, the method comprising:
melting a glass feedstock to produce molten soda-lime-silica glass;
delivering a gob of soda-lime-silica glass to a mold cavity of a blank mold;
shaping the gob of soda-lime-silica glass into a glass parison in the mold cavity of the blank mold, the glass parison having a tubular wall that includes an inside surface, which defines an interior parison cavity open at one axial end of the tubular wall, and an outside surface, the tubular wall of the glass parison further comprising an expandable blow portion;
bringing the expandable blow portion of the glass parison to a forming viscosity between $10^{7.5}$ Pa·s and $10^{5.5}$ Pa·s and also to an isoviscous state in which any temperature gradients within the expandable blow portion of the tubular wall of the glass parison translate into a maximum viscosity difference of $10^2$ Pa·s or less; and
blow molding the glass parison into a glass container by introducing a compressed gas into the interior parison cavity to thereby cause the expandable blow portion of the tubular wall to expand outwardly against an internal mold surface of a mold cavity of a blow mold.

17. The method set forth in claim 16, wherein bringing the expandable blow portion of the glass parison to the forming viscosity and also to the isoviscous state comprises:
cooling the glass parison to bring the expandable blow portion of the tubular wall of the glass parison to a temperature corresponding to the forming viscosity and also to the isoviscous state.

18. The method set forth in claim 16, wherein bringing the expandable blow portion of the glass parison to the forming viscosity and also to the isoviscous state comprises:
cooling the glass parison to a temperature below a glass transition temperature of the soda-lime-silica glass; and
heating the glass parison from below the glass transition temperature of the soda-lime-silica glass to bring the expandable blow portion of the tubular wall of the glass parison to a temperature corresponding to the forming viscosity and also to the isoviscous state.

19. The method set forth in claim 16, wherein the tubular wall of the glass parison further includes a finish portion adjacent to an opening of the interior parison cavity, and wherein the finish portion of the tubular wall is not outwardly expanded during blow molding of the glass parison but instead retains a finish portion shape to provide a finish rim of the glass container.

20. A method of forming a glass container, the method comprising:
loading a glass parison into a blow mold that defines a mold cavity, the glass parison having a tubular wall that includes an inside surface, which defines an interior parison cavity open at one axial end of the tubular wall, and an outside surface, the tubular wall comprising an expandable blow portion having a forming viscosity between $10^{7.5}$ Pa·s and $10^{5.5}$ Pa·s and also being in an isoviscous state in which any temperature gradients within the expandable blow portion of the tubular wall of the glass parison translate into a maximum viscosity difference of $10^2$ Pa·s or less; and
introducing a compressed gas into the interior parison cavity of the tubular wall of the glass parison to outwardly expand the expandable blow portion of the tubular wall, thereby forming a glass container from the glass parison, the glass container comprising a wall that provides a main body and a finish rim that extends axially from the main body, wherein a thickness of the wall of the glass container in the main body is less than a thickness of the tubular wall of the glass parison.

* * * * *